(12) United States Patent
Hofer et al.

(10) Patent No.: US 9,438,574 B2
(45) Date of Patent: Sep. 6, 2016

(54) CLIENT/SERVER AUTHENTICATION OVER FIBRE CHANNEL

(75) Inventors: Larry D. Hofer, Costa Mesa, CA (US); Qiang Liu, Costa Mesa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2069 days.

(21) Appl. No.: 12/346,709

(22) Filed: Dec. 30, 2008

(65) Prior Publication Data
US 2010/0169953 A1   Jul. 1, 2010

(51) Int. Cl.
G06F 7/04 (2006.01)
G06F 17/30 (2006.01)
H04N 7/16 (2011.01)
H04L 29/06 (2006.01)

(52) U.S. Cl.
CPC .................. H04L 63/08 (2013.01)

(58) Field of Classification Search
CPC ...................................... G06F 21/10
USPC .............................. 705/50–79, 30
See application file for complete search history.

(56) References Cited

U.S. PATENT DOCUMENTS

2002/0006133 A1* 1/2002 Kakemizu ............... H04L 63/08
370/401
2006/0259759 A1* 11/2006 Maino ..................... H04L 63/08
713/151
2008/0008202 A1* 1/2008 Terrell ................ H04L 12/5693
370/401

FOREIGN PATENT DOCUMENTS

JP        2002044141 A  *  2/2002  ............. H04L 12/56

* cited by examiner

Primary Examiner — James A Reagan

(57) ABSTRACT

An authentication service to authenticate access requests over a Fiber Channel (FC) network is provided. An authentication request is generated by a client and is sent over the FC network to a server. The request can be a native FC message, such as a CT message. For example, authentication software can generate the native FC message. In another example, authentication software can send a UDP or TCP authentication request, and an application program interface (API) can translate the request into a native FC message, such as a CT message, and send the message over the FC network. In another example, the authentication request can be sent as an encapsulated IP over FC message. For example, an authentication client can communicate using UDP or TCP messages, and an HBA can encapsulate the messages as IP over FC and send the encapsulated messages over the FC network.

26 Claims, 10 Drawing Sheets

CLIENT/SERVER AUTHENTICATION OVER FIBRE CHANNEL

FIELD OF THE INVENTION

This relates generally to the authentication of network devices, and more particularly, to client/server authentication over a Fibre Channel (FC) network.

BACKGROUND OF THE INVENTION

An ever-increasing amount of data and services are being made available for access over distributed systems, such as computer networks. Storage area networks (SANs) are one example of distributed data storage network. A typical SAN includes multiple storage devices and servers or hosts that are networked together to provide a corresponding increase in the amount of storage available to the hosts. The storage devices in a typical SAN can be networked together using a variety of networking technologies. For example, Fibre Channel (FC) is one networking technology used in SANs.

One drawback of networked data storage systems, such as SANs, is that they can be vulnerable to unauthorized access, for example, break-ins by hackers. For this reason, many SANs include an authentication system that prevents a user from accessing a storage device in the SAN until the authentication system authenticates the user's identity and determines that the user is authorized to access the SAN. For example, the requesting device sends a name/password combination to the SAN, and the SAN's authentication process checks the name/password against a list of authorized name/password combinations. In another example, the requesting device sends a cryptographically hashed code to the SAN, and the authentication process runs the same algorithm to determine the authenticity and the authorization of the user.

Authentication servers in SAN's can authenticate devices as described in the prior paragraph. They also can typically be used as a way to authenticate users who login into devices in a network, in this case a SAN.

SUMMARY OF THE INVENTION

In view of the foregoing, an authentication service to authenticate access request messages over a Fibre Channel network is provided. An authentication request message for the authentication service is generated by a client device, and the authentication request message is sent over an FC network to a server. The authentication request message can be, for example, a native FC message such as a CT message. In this case, for example, an authentication client software can generate the native FC message to send to the server. In another example, an authentication client software can send a UDP or TCP authentication request message, and a driver application program interface (API) can translate the UDP or TCP message into a native FC message, such as a CT message, and send the native FC message over the FC network. The authentication request message can be sent, for example, as an encapsulated IP over FC message. In this case, for example, an authentication client software can generate and send a UDP or TCP authentication request message, and an HBA can encapsulate the UDP or TCP message as IP over FC and send the encapsulated message over the FC network.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Although embodiments of the invention may be described and illustrated herein in terms of SANs, it should be understood that embodiments of this invention are not so limited, but are additionally applicable to other network environments, such as application server systems, wireless communication networks, corporate intra-networks, etc. Furthermore, although embodiments of the invention may be described and illustrated herein in terms of networks using FC switches solely or Fiber Channel switches implemented in a Fibre Channel over Ethernet (FCoE) environment, it should be understood that embodiments of the invention are also applicable to other system configurations and protocols, such as SAS, SATA, Infiniband, which may require porting to the corresponding technology.

Figure 1:
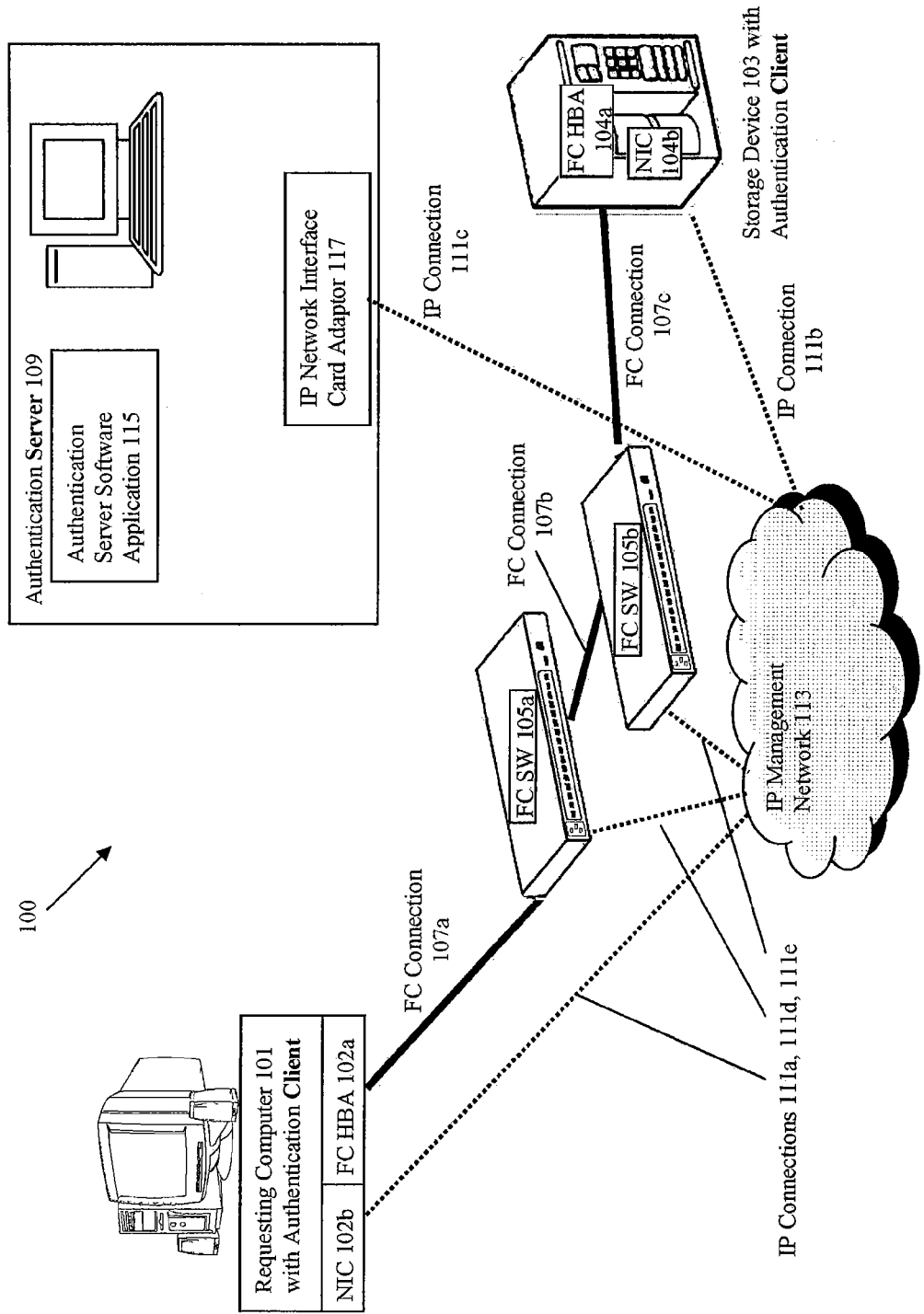
FIG. 1 illustrates an example storage area network (SAN) with an authentication system.

FIG. 1 illustrates an example SAN 100 that includes an authentication system. A requesting computer 101 is linked to a storage device 103 through a Fibre Channel fabric of FC switches 105a-b and FC connections 107a-c. A Host Bus Adapter (HBA) 102a in requesting computer 101 and an HBA 104a in storage device 103 provide interfaces to the FC fabric. Requesting computer 101 could be any computing device that accesses stored data, for example, a personal computer, a peripheral device, a server, a portable computing device, etc. Likewise, storage device 103 could be any type of storage device capable of use in SAN 100, including a hard drive, a tape drive, an optical disk drive, a solid state memory device, virtual storage device, or other device or a plurality of devices such as a JBOD Oust a bunch of disks), a Redundant Array of Independent Disks (RAID) array, a jukebox of optical disks, etc.

FIG. 1 also shows requesting computer 101, storage device 103, authentication server 109, and FC switches 105a-b connected to an Internet protocol (IP) management network 113 through IP connections 111a-e. Network interface cards (NICs), such as NIC 102b in requesting computer 101, NIC 104b in storage device 103, and NIC 117 in authentication server 109, provide interfaces to IP management network 113. Authentication server 109 could be any device capable of supporting an authentication function of SAN 100, including a Remote Authentication Dial In User Service (RADIUS) server, a Terminal Access Controller Access-Control System Plus (TACACS+) server, a DIAMETER server, etc. While a plurality of requesting computers, storage devices, etc. could be linked together through the FC fabric, FIG. 1 shows a single requesting computer and storage device for the sake of clarity. Likewise, the IP management network could link together a plurality of clients, storage devices, and authentication servers, although for clarity only one of each is illustrated in FIG. 1.

In the example SAN illustrated in FIG. 1, requesting computer 101 requests access to storage device 103 by sending an access request message to storage device 103 through the FC fabric, that is, through FC connections 107a-c and FC switches 105a-b. For example, the access request message could include a request to send a file stored in storage device 103 to requesting computer 101. The access request message may include the requestor's name that is subsequently authenticated to ensure proper authorization for access to the requested data, e.g., the requested file. Prior to sending the requested file to requesting computer 101, the name of the entity issuing the access request is authenticated using authentication server 109. In particular, storage device 103 sends an authentication request message to authentication server 109. The authentication request message includes the authentication data from the access request message (e.g. challenge message), which is processed by authentication server software application 115 to determine the authentication of the access request message sender.

In the example system of FIG. 1, storage device 103 sends the authentication request message to authentication server 109 through IP management network 113, that is, through IP connections 111b and 111c, and IP management network 113. The authentication request message is received by NIC 117 of authentication server 109, which processes the message via a standard IP stack, e.g., stripping away IP headers/routing headers, and sends the authentication request data up the stack to be processed by authentication server software application 115. After processing the authentication request, authentication server 109 sends a reply message (such as a pass/fail message) via IP protocols to storage device 103.

FIG. 1 shows an example of an authentication process that could be used. Storage device 103 might alternatively skip this authentication process for the sender of the access request by, for example, sending the requested file or data to requesting computer 101 without authenticating. On the other hand, storage device 103 might decide to authenticate requesting computer 101, as shown, prior to sending the file. In general, a decision whether to authenticate can be dependent on, for example, the connection between one device and another. For example, a system with clients A to Z and storage devices 1 to 20 might be set up so that communications between A and 5, B and 5, B and 7, D and 20, etc . . . require authentication, but other connections do not.

Figure 2:
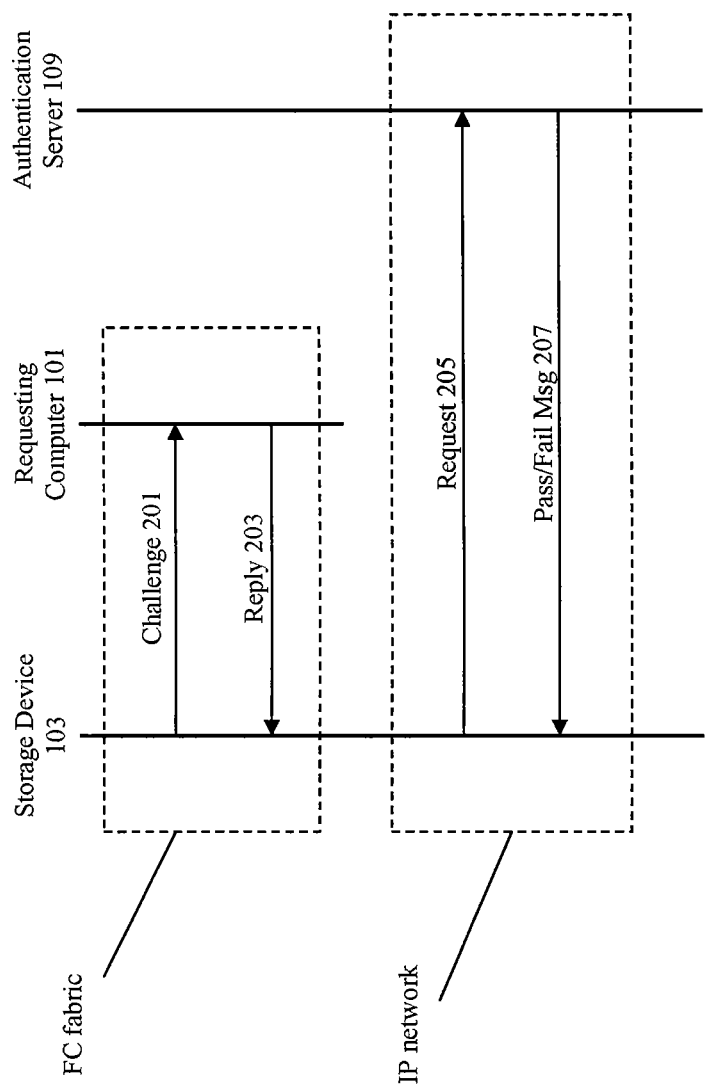
FIG. 2 illustrates an example flow of authentication messages in the SAN of FIG. 1.

FIG. 2 illustrates an authentication process that can occur after storage device 103 receives such an access request message from requesting computer 101. As shown in the example of FIG. 2, storage device 103 sends a challenge message 201 to requesting computer 101 over the FC fabric, and the requesting computer replies with a reply message 203 over the FC fabric. The reply message includes authentication data of requesting computer 101.

It is noted that one way to handle authentication (not shown in FIG. 2) is by processing a reply message locally. That is, authentication can be handled without an authentication server by processing the authentication data in the reply message locally, e.g., storage device 103 runs an authentication application locally to verify the reply message from requesting computer 101. This would potentially require each SAN device to have locally installed authentication software and to use local processor time with verification processing. In addition, in the case that the authentication scheme utilizes individual authentication keys (such as passwords), each SAN device could potentially be required to handle many keys (e.g., a pair of keys, one for each direction in bi-directional authentication for each connection the device has with another device). Such an authentication process for an FC SAN typically is handled via a Challenge-Handshake Authentication Protocol (CHAP), such as DH-CHAP (Diffie-Hellman CHAP).

Referring again to FIG. 2, storage device 103 sends the authentication data encapsulated in an IP authentication request message 205 over IP management network 113. Similar to the example of FIG. 1, authentication server 109 receives authentication request message 205 and processes the authentication data through authentication server software application 115. Authentication server 109 generates and transmits a pass/fail message 207 to storage device 103 over IP management network 113. If requesting computer 101 is authenticated (i.e., message 207 indicates "pass"), then storage device 203 sends the requested file/data.

Figure 3:
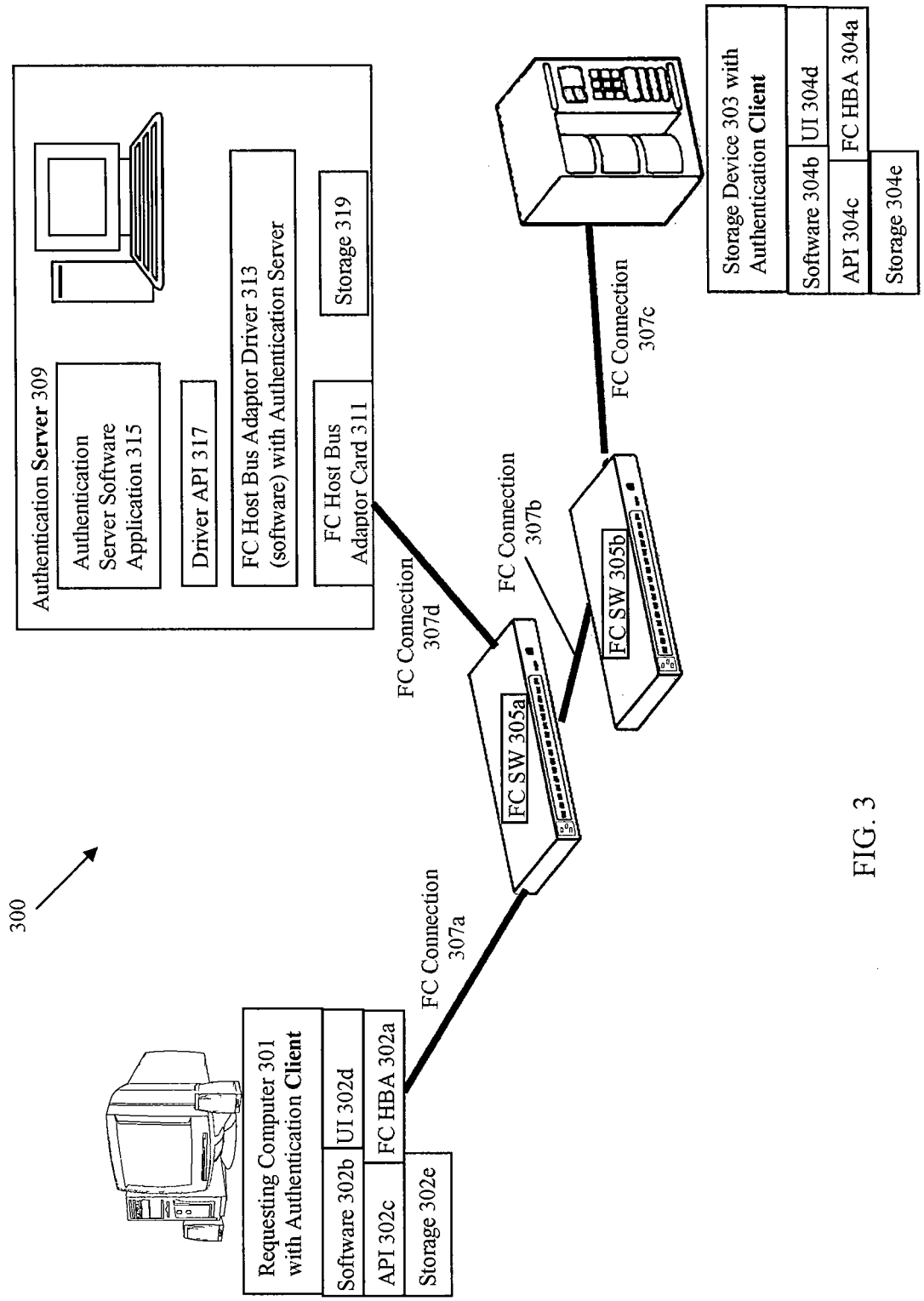
FIG. 3 illustrates an example SAN with an authentication system according to embodiments of the invention.

FIG. 3 illustrates an example SAN 300 including an authentication system according to embodiments of the invention. SAN 300 includes a requesting computer 301 with an authentication client application software 302b, a driver application program interface (API) 302c, a user interface 302d, a storage medium 302e, and an HBA 302a linked to a storage device 303 with an authentication client application software 304b, a driver API 304c, a storage medium 304e, and an HBA 304a through a Fibre Channel fabric including FC switches 305a-b and FC connections 307a-c. SAN 300 also includes an authentication server 309 that includes an authentication server software application 315. Unlike the system of FIG. 1, authentication server 309 is linked to the FC fabric through an FC connection 307d. Specifically, authentication server 309 includes an HBA 311 that is connected to FC connection 307d, which is connected to FC switch 305a. Authentication server 309 also includes an FC HBA driver 313, a driver API 317 to interface to authentication server software application 315, and a storage medium 319. Storage media 302e, 304e, and 319 store computer-executable program instructions that are executed to perform the processes described herein. The storage media can be, for example, computer memory, disk drives, optical memory, etc.

SAN 300 allows authentication communications using Fibre Channel. In this example system, a new set of native FC messages can be created and utilized for the authentication communications.

In other words, client/server authentication messages/commands can be implemented in CT (Common Transport) layer of Fibre Channel sent over the Fibre Channel fabric using FC layer 2 protocols. APIs 302c, 304c and 317 can provide an interface for those applications that do not communicate using native FC messages. For example, authentication client application software 302b and 304b and authentication server application software 315, which can communicate using UDP or TCP, can call a respective API to translate to/from native FC messages. In this case, some native FC messages can be created that correspond to authentication messages in UDP or TCP, such as conventional IP authentication messages such as those defined in RADIUS.

In some cases, other native FC authentication messages can be created that provide additional functionality and benefits over conventional authentication messages using UDP. For example, authentication client/server application software that communicates via native FC messages can be created. Authentication services offered by this software could take advantage of the full range of authentication services included with Fibre Channel. In the present embodiment, user interface 302d can be a graphical user interface (GUI) capable of communication using native FC messages, such as HBAnyware™ of Emulex SAN management software, which can provide tools to interface with HBA 304a of storage device 303, allowing a user to access and manage FC functions of HBA 304a. In this example, user interface 302d can configure the use of the new set of native FC messages created for the authentication communications. The username of the person using the user interface of SAN devices may also be authenticated using the new messages between the authentication client/server. User interface 302d is a stand-alone software program in the present example, but in other embodiments user interface 302d might be included in or bundled with another software program, such as authentication client application software 304b. Authentication client application software 304b of storage device 303 can operate independently of and/or in conjunction with user interface 302d to manage authentication functions of storage device 303. That is, the user interface, for example, could force an authentication of the device to occur. Both user interface 302d and authentication client application software 304b can send/receive messages through HBA 304a.

Figure 4:
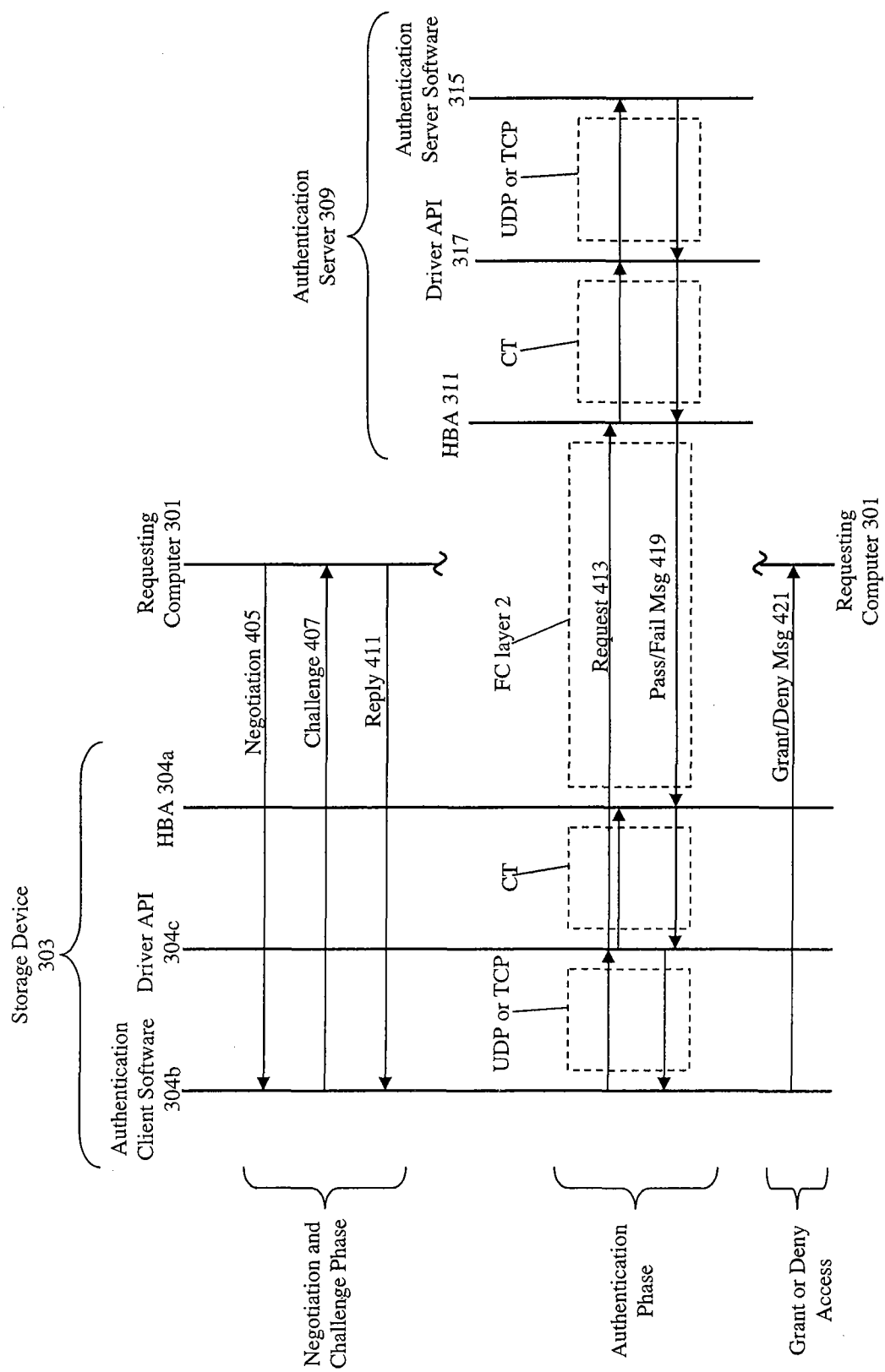
FIG. 4 illustrates an example authentication process according to embodiments of the invention.

FIG. 4 illustrates an example authentication process according to embodiments of the invention. Requesting computer 301 requests access to storage device 303 by sending a negotiation message 405 to the storage device. After receiving negotiation message 405, authentication client software 304b sends an authentication challenge 407 to requesting computer 301. HBA 304a sends authentication challenge 407 as a lower layer standard FC message to requesting computer 301. Requesting computer 301 replies with a reply message 411. Upon receipt, reply message 411 is routed appropriately (e.g., to authentication client application software 304b). Authentication client software 304b initiates an authentication process using native FC messages. In particular, after receiving reply message 411, which includes authentication data of requesting computer 301 (such as hash of authentication key and other identity information), storage device 303 sends an authentication request message 413 to authentication server 309 as a Fibre Channel CT message through the Fibre Channel fabric, FC layer 2.

More specifically, authentication client software 304b sends authentication request message 413 as a UDP or TCP message, which is converted by driver API 304c into a CT message. The CT message is processed by HBA 304a and sent over FC layer 2 to authentication server 309. As described in more detail below with reference to FIGS. 5 and 6, the CT authentication request message 413, and other native FC-based messages and commands sent to authentication server 309, are processed by HBA 304a down a network stack for transporting authentication client/server messages over the Fibre Channel fabric.

Authentication server 309 receives request message 413 and processes the request message up a network stack of HBA 311 from FC layer 2 to a FC CT layer and sends the request message to driver API 317. Driver API 317 converts the message into a UDP or TCP message, which is sent to authentication server application software 315. Application software 315 processes request message 413 and sends a reply message 419, e.g. indicating a pass or a fail, in UDP or TCP to driver API 317. Driver API 317 converts the UDP or TCP reply message into a CT reply message, and sends the CT reply message to HBA 311. HBA 311 processes CT reply message 419 down the network stack to FC CT layer and then FC layer 2 and sends the reply message to storage device 303 through the FC fabric. Storage device 303 receives and processes reply message 419 through the network stack of HBA 304a and sends CT reply message 419 to driver API 304c. Driver 304c converts CT reply message 419 into a UDP or TCP reply message 419 and sends the reply message to authentication client software 304b, which determines whether to send the requested file/data to requesting computer 301 based on the pass/fail indicated by reply message 419. Authentication client software 304b sends a grant/deny message 421 to requesting computer 301. For example, if reply message 419 indicated "pass", the message 421 can be the file/data that computer 301 requested. If reply message 419 indicated "fail", message 421 can indicate that requesting computer 301 has failed authentication.

Figure 5:
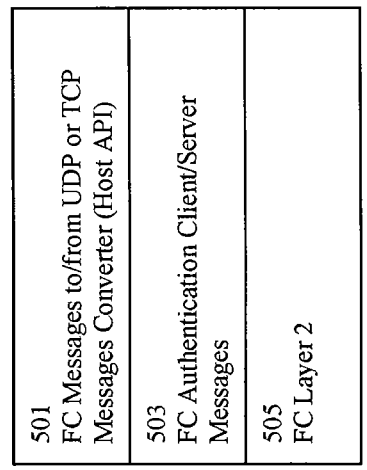
FIG. 5 illustrates an example network stack according to embodiments of the invention.

FIG. 5 shows an example network stack 500 according to embodiments of the invention. The network stacks of HBA 304a and HBA 311 could be, for example, each implemented as a network stack 500. Network stack 500 includes a layer 501 for converting FC authentication client/server messages in CT protocol into Transmission Control Protocol (TCP) or User Datagram Protocol (UDP) Stack 500 also includes layer 503 for layer 3 processing of FC authentication client/server messages and a layer 505 for processing messages in FC layer 2.

Network stack 500 allows storage device 303 and authentication server 309 to communicate over the FC fabric using native FC messages. In particular, new FC authentication client/server messages can be created to implement a variety of authentication functions. Some FC authentication client/server messages could, for example, implement functions similar to conventional authentication command messages, e.g., RADIUS server commands, such as authentication request messages, pass/fail messages, etc. On the other hand, some FC authentication client/server messages could implement new functionality. Because FC authentication client/server messages utilize FC, network stack 500 can implement additional services beyond those available in conventional IP server authentication, such as those defined in RADIUS. In other words, many authentication services that are already supported by FC can be tapped into by new FC authentication client/server messages that are sent and received through network stacks such as network stack 500 in, for example, storage device 303 and authentication server 309 of example SAN 300.

Figure 6:
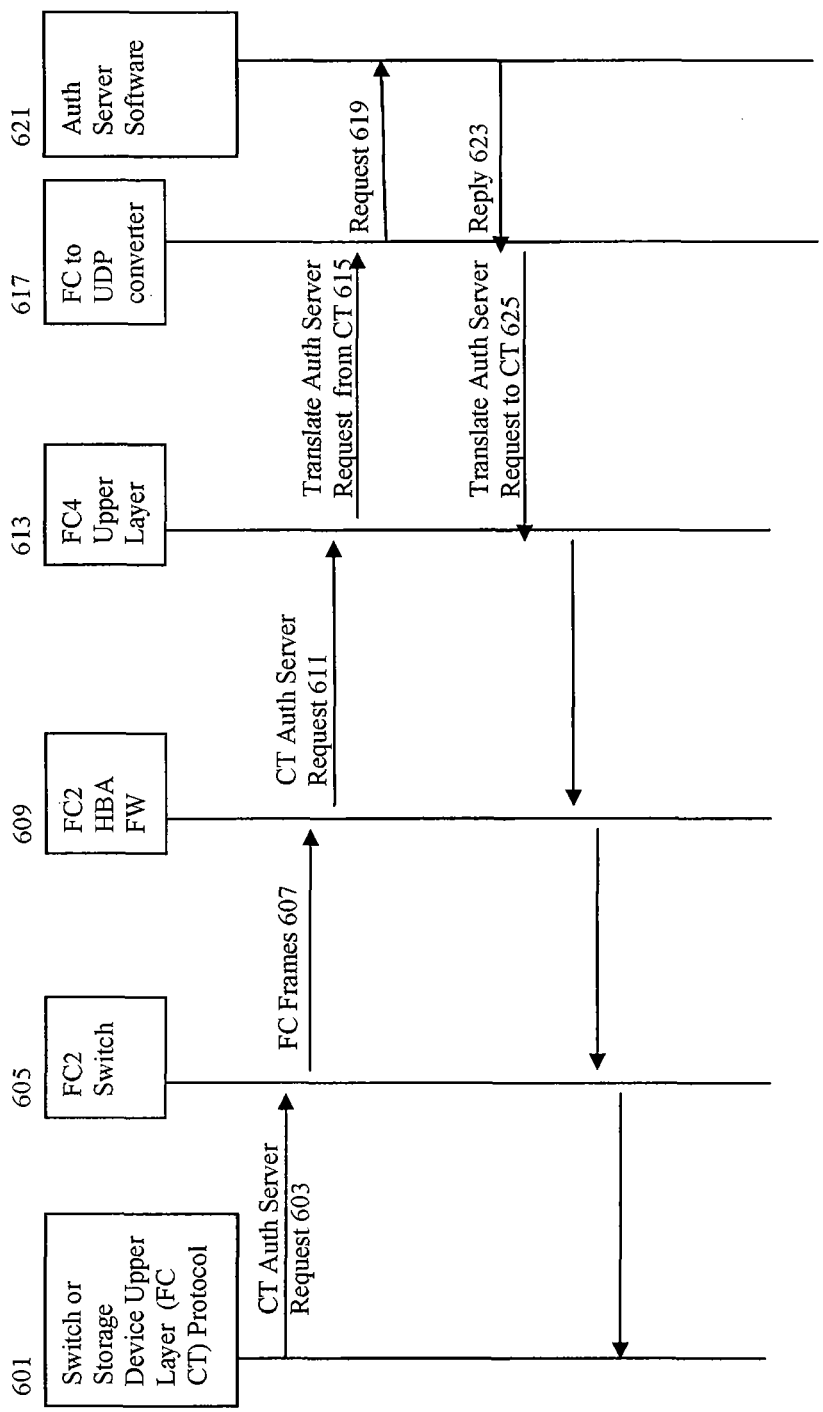
FIG. 6 illustrates an example flow of authentication messages according to embodiments of the invention.

FIG. 6 shows an example flow of authentication messages according to embodiments of the invention. A device 601, such as a switch, storage device, etc., processing an authentication request message in a ULP, such as CT protocol, sends an authentication request message 603 to a device 605, such as an HBA, switch, etc. Device 605 processes request message 603 into FC layer 2, and sends the request message as FC frames 607 to a device 609. Device 609 is, for example, another HBA, switch, etc. of an authentication server. Device 609 processes FC frames 607 into an authentication request message 611, and sends the request message to be processed in a ULP process 613, such as CT protocol. ULP process 613 sends the request message 615 to an FC to UDP converter 617, which converts the request message to UDP as request message 619 and sends request message 619 to be processed by authentication server application software 621. Software 621 generates and sends a reply message 623, which is in UDP format. Reply message 623 is converted by device 617 into CT protocol, and the reply message is sent back to device 601 through processing similar to the foregoing.

Figure 7:
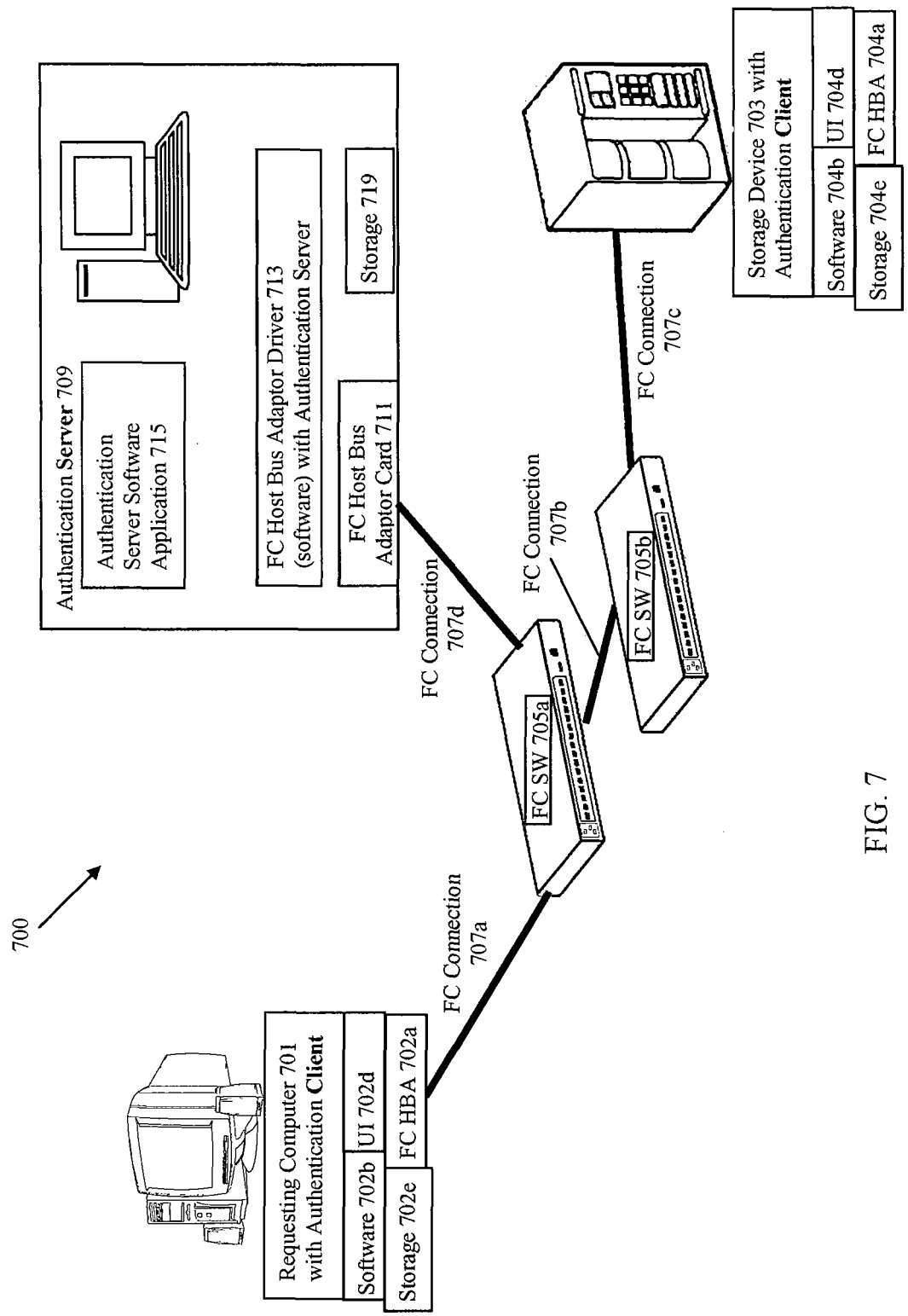
FIG. 7 illustrates another example SAN with an authentication system according to embodiments of the invention.

FIG. 7 illustrates another example SAN 700 including an authentication system according to embodiments of the invention. Similar to the system of FIG. 3, SAN 700 includes a requesting computer 701 with an authentication client application software 702b, user interface 702d, a storage medium 702e, and an HBA 702a linked to a storage device 703 with an authentication client application software 704b, user interface 704d, a storage medium 704e, and an HBA 704a through a Fibre Channel fabric including FC switches 705a-b and FC connections 707a-c. SAN 700 also includes an authentication server 709 that includes an authentication server software application 715. Authentication server 709 is linked to the FC fabric through an FC connection 707d. Specifically, authentication server 709 includes an HBA 711 that is connected to FC connection 707d, which is connected to FC switch 705a. Authentication server 709 also includes an FC HBA driver 713 and storage medium 719. Storage media 702e, 704e, and 719 store computer-executable program instructions that are executed to perform the processes described herein. The storage media can be, for example, computer memory, disk drives, optical memory, etc In contrast to the example system of FIG. 3, SAN 700 allows authentication communications over the Fibre Channel fabric while utilizing UDP or TCP messages more directly (e.g., without native FC authentication messages). For example, authentication messages/commands in UDP or TCP protocol can be encapsulated within FC messages, such as IPv6 or IPv4 over FC messages. In this example, the HBAs process messages using a network stack, described in more detail below with respect to FIG. 9, to encapsulate/decapsulate UDP or TCP authentication messages when an HBA communicates with a user interface and/or an authentication client/server application software. Thus, unlike the system of FIG. 3, requesting computer 701, storage device 703, and authentication server 709 do not include application program interfaces because there is no need to translate between UDP or TCP messages and native FC authentication messages.

Figure 8:
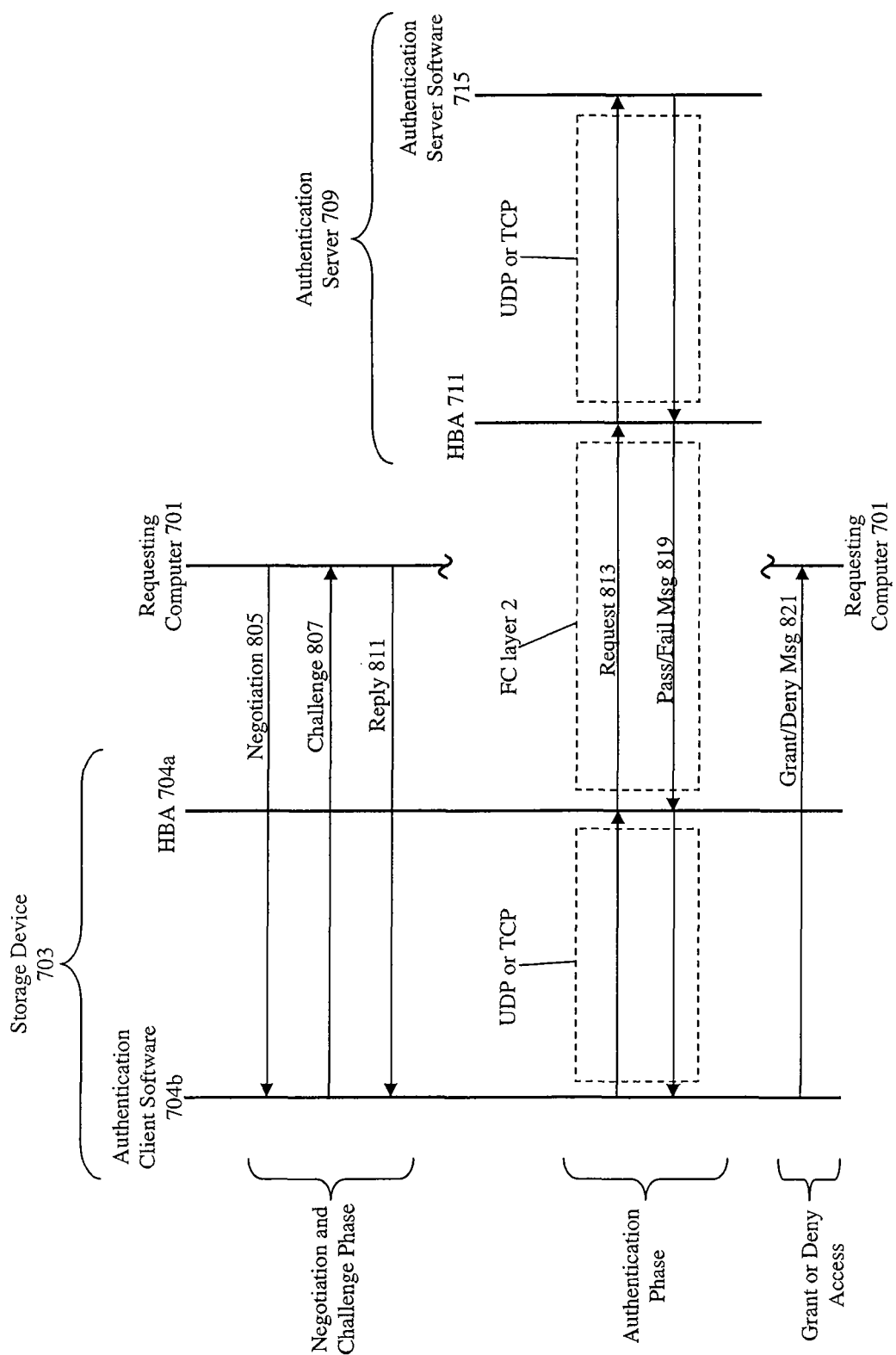
FIG. 8 illustrates another example authentication process according to embodiments of the invention.

FIG. 8 illustrates an example authentication process according to embodiments of the invention. Requesting computer 701 requests access to storage device 703 by sending a negotiation message 805 to the storage device. After receiving negotiation message 805, authentication client software 704b sends an authentication challenge 807 to requesting computer 701. HBA 704a sends authentication challenge 807 as a lower layer standard FC message to requesting computer 701. Requesting computer 701 replies with a reply message 811. Upon receipt, reply message 811 is routed appropriately (e.g., to authentication client application software 704b). Authentication client software 704b initiates an authentication process using UDP or TCP messages. In particular, after receiving reply message 811, which includes authentication data of requesting computer 701 (such as hash of authentication key and other identity information), storage device 703 sends an authentication request message 813 to authentication server 709 as a UDP or TCP message, which is encapsulated as IP over FC and transmitted through the Fibre Channel fabric, FC layer 2.

More specifically, after receiving an access request message from requesting computer 701, authentication client software 704b sends a UDP or TCP request message 813 to HBA 704a. HBA 704a encapsulates UDP or TCP request 813 as an IP over FC message, which is transmitted to authentication server 709 as a Fibre Channel layer 2 message. Authentication server 709 receives request message 813 and processes the request message via HBA 711 to decapsulate the UDP or TCP request message 813, which is sent to authentication server software 715. Authentication server software 715 processes request message 813 and sends a UDP or TCP reply message 819, e.g. indicating a pass or a fail, to HBA 711. HBA 711 processes the reply message to encapsulate the UDP or TCP message as an IP over FC message, which is transmitted to storage device 703 over FC layer 2 through the FC fabric. Storage device 703 receives and decapsulates UDP or TCP reply message 819 through the network stack of HBA 704a, and sends the UDP or TCP reply message to authentication client software 704b, which determines whether to send the requested file/data to requesting computer 701 based on the pass/fail indicated by reply message 819. Authentication client software 704b sends a grant/deny message 821 to requesting computer 701. For example, if reply message 819 indicated "pass", the message 821 can be the file/data that computer 701 requested. If reply message 819 indicated "fail", message 821 can indicate that requesting computer 701 has failed authentication.

Figure 9:
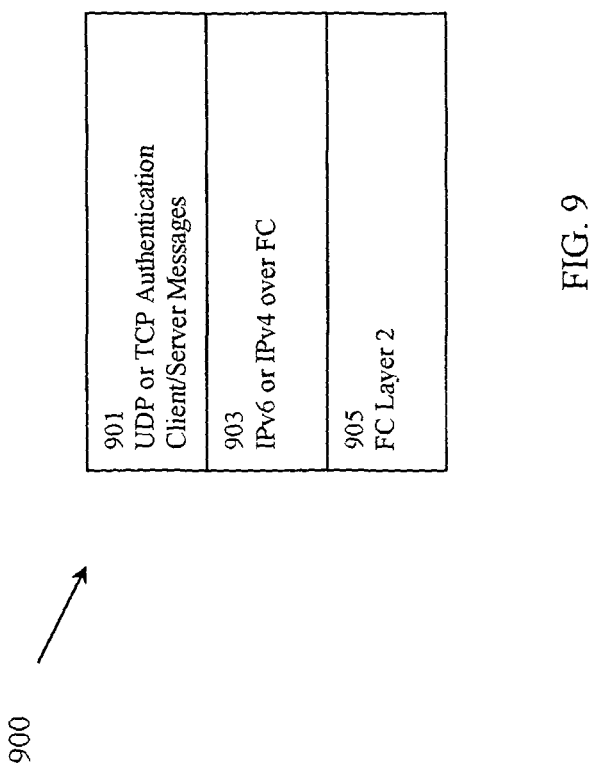
FIG. 9 illustrates another example network stack according to embodiments of the invention.

FIG. 9 shows an example network stack 900 according to embodiments of the invention. The network stacks of HBA 704a and HBA 711 could be, for example, each implemented as a network stack 900. Network stack 900 includes a layer 901 for encapsulating authentication client/server messages in UDP or TCP protocol as IPv6 or IPv4 over FC messages. Stack 900 also includes layer 903 for layer 3 processing of encapsulated authentication client/server messages and a layer 905 for processing messages in FC layer 2.

Network stack 900 allows storage device 703 and authentication server 709 to communicate UDP or TCP messages over the FC fabric using encapsulation. Utilizing network stacks 900 in SAN 700, for example, can allow conventional UDP or TCP authentication commands to be used, while at the same time potentially gaining benefits of increased reliability and faster boot up of Fibre Channel.

Figure 10:
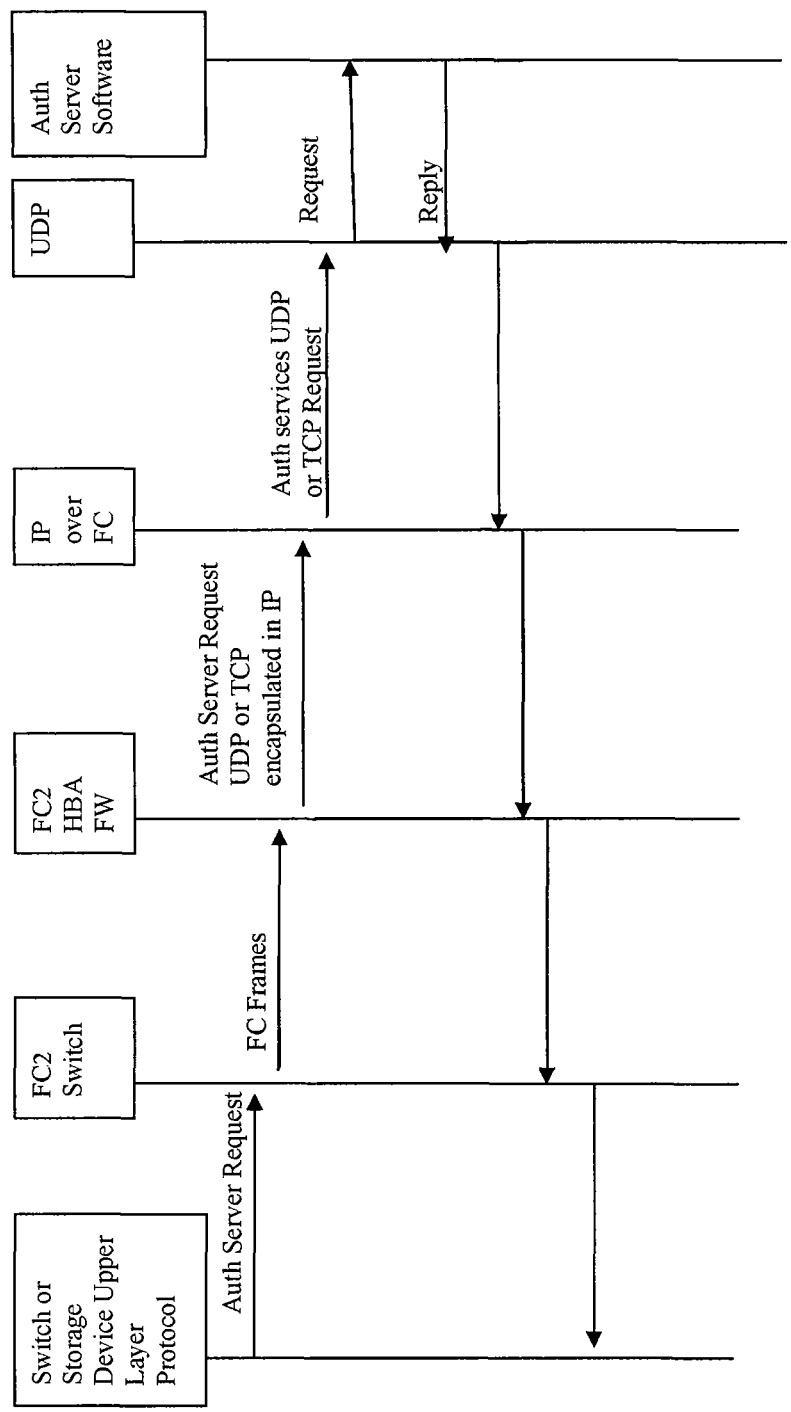
FIG. 10 illustrates another example flow of authentication as it traverses the storage network stack according to embodiments of the invention.

FIG. 10 shows another example flow of authentication messages according to embodiments of the invention. A device 1001, such as a switch, storage device, etc., processing an authentication request message in a ULP, such as UDP or TCP protocol, sends the authentication request message 1003 to a device 1009, such as an HBA, switch, etc. Device 1009 encapsulates the UDP or TCP request message 1003 into IP over FC as an encapsulated message 1011 and sends the encapsulated message via FC layer 2 to a device 1013. Device 1013 is, for example, another HBA, switch, etc. of an authentication server. Device 1013 processes encapsulated message 1011 to decapsulate the message to a UDP or TCP authentication request message 1015, and sends the request message to be processed by authentication server application software 1021. Software 1021 generates and sends a reply message 1023, which is in UDP format. Reply message 1023 is encapsulated into IP over FC by device 1013, and the encapsulated reply message is sent back to device 1001 through processing similar to the foregoing.

The foregoing example embodiments, and other embodiments, can potentially provide many advantages over conventional systems. For example, using Fibre Channel as the transport layer for authentication communications can be more reliable than utilizing IP communications for authentication purposes. In addition, failover systems could be implemented within a single authentication server, for example, by providing the server with multiple HBAs that have authentication capability. This may also reduce the complexity of a cascaded or chained authentication system, which could potentially allow for quicker setup and maintenance procedures.

In addition, as discussed above, Fibre Channel's fast availability at boot up may be exploited in an authentication system. This would increase the availability of the authentication system, and could reduce or eliminate the wait time between when a Fibre Channel device is available after bootup and when authentication services are available after the bootup. For example, many conventional SANs that utilize Fibre Channel for data transfer/communication cannot take advantage of Fibre Channel's fast bootup because, even though the Fibre Channel devices are ready to be accessed quickly after bootup, the conventional authentication services for the storage area network are not available until the IP stack is fully initialized. Therefore, the Fibre Channel devices in many conventional SANs must wait for authentication services through traditional RADIUS server to become available before allowing access.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, although authentication services are provided in the above example embodiments by a dedicated authentication server, authentication services could be provided by incorporating some or all of the foregoing authentication server functions into one or more Fibre Channel fabric switches.

What is claimed is:

1. A method for providing an authentication service to authenticate an access request from a computer, comprising:
   receiving the access request from the computer at a storage device of a Fibre Channel (FC) network;
   generating, at the storage device, an authentication request message for the authentication service, wherein the message identifies the computer;
   sending the message for the authentication service from the storage device over a Common Transport (CT) layer of a Fibre Channel (FC) network via FC layer 2 protocols;
   receiving the message in accordance with FC layer 2 protocols at a FC interface of a server that provides the authentication service;
   generating, by the server, a reply to the message;
   sending the reply from the server device over the CT layer of the FC network via FC layer 2 protocols; and
   receiving the reply at the storage device, the reply providing an indication of whether the access request from the computer has been authenticated.

2. A method for receiving an authentication service to authenticate an access request from a computer, comprising:
   generating, by a storage device, an authentication request message for the authentication service, wherein the message identifies the computer;
   sending the message from the storage device over a Common Transport (CT) layer of a Fibre Channel (FC) network via FC layer 2 protocols; and
   receiving a reply in response to the message over the CT layer of the FC network via FC layer 2 protocols, the reply providing an indication of whether the access request from the computer has been authenticated.

3. The method of claim 2, wherein the method comprises processing the message in a common transport (CT) protocol of FC.

4. The method of claim 2, wherein the method comprises processing the message in FC layer 2.

5. The method of claim 2, wherein generating the message includes translating the message from a non-FC protocol into an upper layer protocol (ULP) of FC.

6. The method of claim 5, wherein the non-FC protocol is one of universal datagram protocol (UDP) and transmission control protocol (TCP).

7. The method of claim 5, wherein the ULP is a common transport (CT) layer of FC.

8. The method of claim 2, wherein generating the message includes processing the message in a non-FC protocol, and sending the message includes encapsulating the message in an FC message.

9. The method of claim 8, wherein the message is encapsulated as one of IPv6 over FC and IPv4 over FC.

10. A method for providing an authentication service to authenticate an access request from a computer, comprising:
    receiving, by a server that provides the authentication service, an authentication request message from a storage device for the authentication service sent over a Common Transport (CT) layer of a Fibre Channel (FC) network via FC layer 2 protocols by a storage device of the FC network, wherein receiving the message includes processing the message from a lower layer protocol (LLP) of FC to an upper layer protocol (ULP) of FC;
    generating, by the server, a reply to the authentication request message; and
    sending the reply from the server over the FC network, the reply providing an indication of whether the access request from the computer has been authenticated.

11. The method of claim 10, wherein the ULP is a common transport (CT) protocol of FC.

12. The method of claim 10, wherein the LLP is FC layer 2.

13. The method of claim 10, wherein generating the reply includes translating the reply from a non-FC protocol into an upper layer protocol (ULP) of FC.

14. The method of claim 13, wherein the non-FC protocol is one of universal datagram protocol (UDP) and transmission control protocol (TCP).

15. The method of claim 13, wherein the ULP is a common transport (CT) protocol of FC.

16. A system for providing an authentication service to authenticate an access request from a computer, comprising:
    a storage device that generates and sends an authentication request message for the authentication service over a Common Transport (CT) layer of a Fibre Channel (FC) network via FC layer 2 protocols, and receives a reply to the message, the reply providing an indication of whether the access request from the computer has been authenticated;

a server that receives the message, and generates and sends the reply to the message; and a Fibre Channel (FC) network that transports the message and the reply, wherein the message is generated by processing the message under an upper protocol (ULP) of Fibre Channel (FC) standards, and received by processing the message from a lower layer protocol (LLP) of FC to the ULP of FC, and wherein the reply is generated by translating the reply message from a non-FC protocol into the ULP of FC.

17. A storage device in a system for providing an authentication service to authenticate an access request from a computer, comprising:

a generator that generates an authentication request message for the authentication service; and an adapter that sends the message over a Fibre Channel (FC) network by processing the message from an upper layer protocol (ULP) of FC to a lower layer protocol (LLP) of FC, and receives a reply to the message over the FC network, the reply providing an indication of whether the access request from the computer has been authenticated.

18. The storage device of claim 17, wherein the generator generates the authentication request message in a non-FC protocol, the storage device further comprising:

an application interface that translates the message from the non-FC protocol into an upper layer protocol (ULP) of FC.

19. The method of claim 17, wherein the generator generates the message in a non-FC protocol, and sending the message by the adapter includes encapsulating the message in an FC message.

20. A server device in a system for providing an authentication service to authenticate an access request from a computer, comprising:

an adapter that receives an authentication request message for the authentication service over a Common Transport (CT) layer of a Fibre Channel (FC) network via FC layer 2 protocols from a storage device, and sends a reply to the message over the FC network to the storage device; and a generator that generates the reply, wherein receiving the message by the adapter includes processing the message from a lower layer protocol (LLP) of FC to an upper layer protocol (ULP) of FC.

21. The server device of claim 20, wherein generating a reply by the generator includes translating the message from a non-FC protocol into an upper layer protocol (ULP) of FC.

22. Computer-executable program instructions, stored on a computer-readable medium, for supporting an authentication service to authenticate an access request from a computer, the program instructions executable to perform a method comprising:

receiving an authentication request message for the authentication service, wherein the message is in an upper layer protocol (ULP) of FC;

processing the message from the ULP to a lower layer protocol (LLP) of FC;

sending the message over a a Common Transport (CT) layer of a Fibre Channel (FC) network via FC layer 2 protocols from a storage device; and receiving an indication of whether the access request from the computer has been authenticated.

23. The program instructions of claim 22, the program instructions incorporated in a network stack.

24. The program instructions of claim 23, the network stack incorporated in a host bus adapter and associated software.

25. Computer-executable program instructions, stored on a computer-readable medium, for supporting an authentication service to authenticate an access request from the requesting computer, the program instructions executable to perform a method comprising:

receiving an authentication request message for the authentication service, wherein the message is in a non-FC protocol;

processing the message by translating the message from the non-FC protocol into an upper layer protocol (ULP) of FC;

sending the message to be transmitted over a Common Transport (CT) layer of a Fibre Channel (FC) network via FC layer 2 protocols from a storage device; and receiving an indication of whether the access request from the computer has been authenticated.

26. The program instructions of claim 25, the program instructions incorporated in an application program interface.

* * * * *